Figure 1:
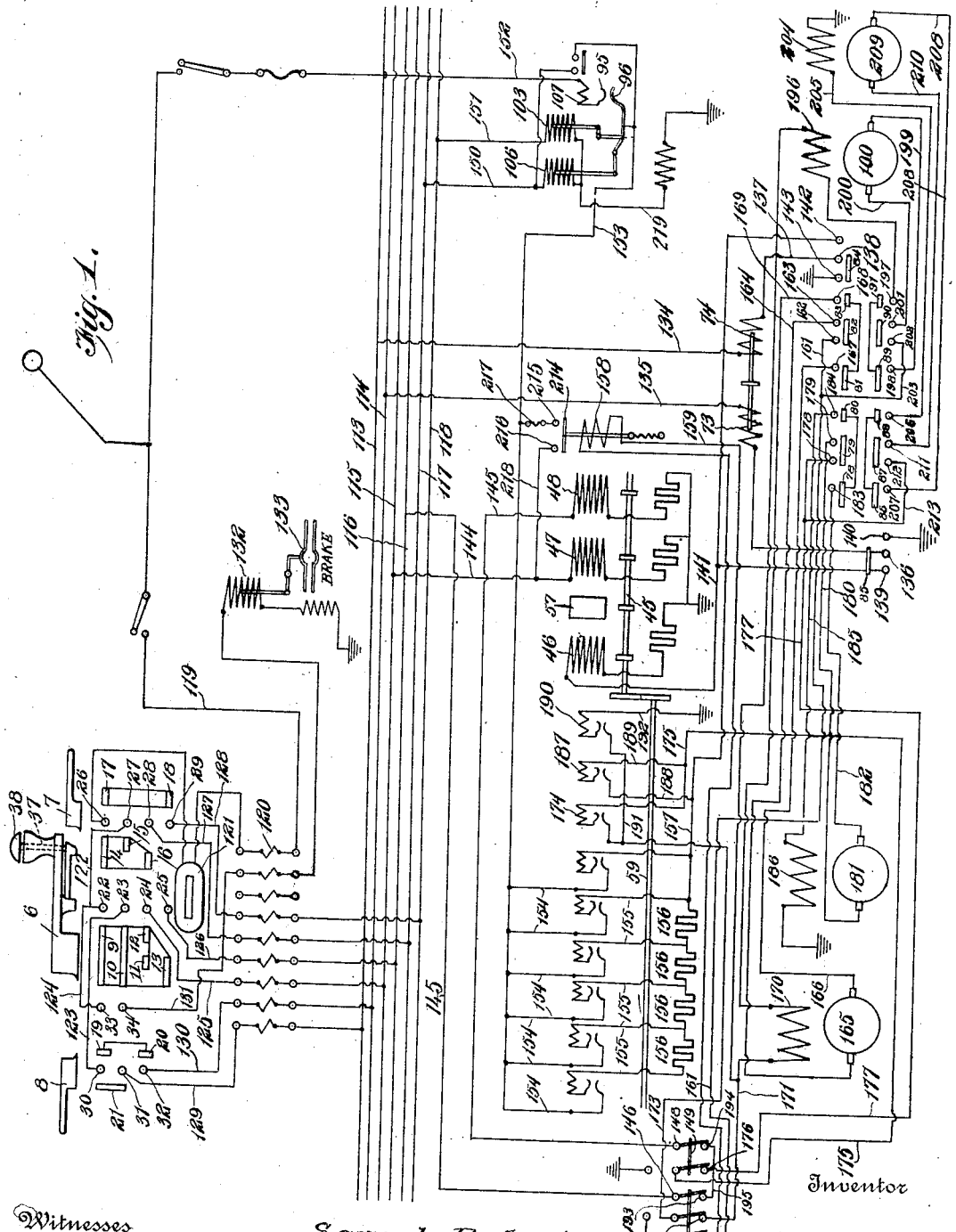

S. P. ARMSTRONG.
AUTOMATIC CONTROLLER.
APPLICATION FILED NOV. 10, 1909.

1,058,519.

Patented Apr. 8, 1913.

2 SHEETS—SHEET 1.

Witnesses
Louis R. Heinriche
D. W. Gould

Inventor
Samuel P. Armstrong
By Victor J. Evans
Attorney

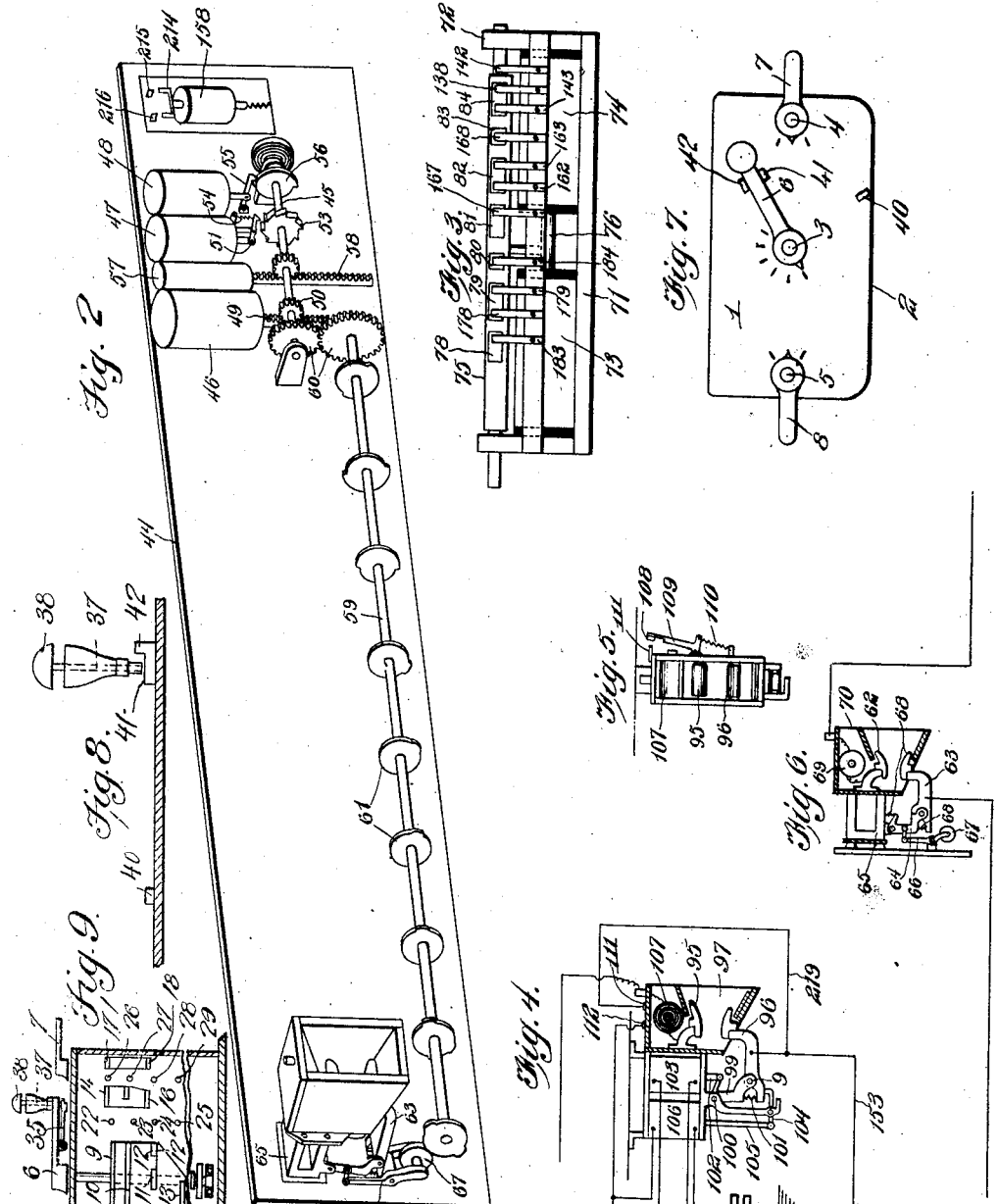

UNITED STATES PATENT OFFICE.

SAMUEL P. ARMSTRONG, OF FORT SCOTT, KANSAS.

AUTOMATIC CONTROLLER.

1,058,519.     Specification of Letters Patent.     Patented Apr. 8, 1913.

Application filed November 10, 1909. Serial No. 527,275.

*To all whom it may concern:*

Be it known that I, SAMUEL P. ARMSTRONG, a citizen of the United States, residing at Fort Scott, in the county of Bourbon and State of Kansas, have invented new and useful Improvements in Automatic Controllers, of which the following is a specification.

The invention relates to an improvement in control systems for motor propelled vehicles, being more particularly directed to a system in which a main controller is adapted for automatic actuation in certain running positions of a master controller, certain running positions of the latter serving to check the operation of the main controller at any desired point.

The main object of the present invention is the provision of a control system in which the energization and control of the motor circuits are governed from a main controller, and the latter governed by control circuits operated from a master controller.

Another object of the invention is the provision of a master controller in which the control circuits are governed, and which circuits include main conductors adapted for endwise coupling to similar conductors of connected vehicles, whereby the master controller of any one vehicle may, through the connected main conductors of all vehicles, govern the control circuits of all vehicles.

Another object of the invention is the provision of a circuit breaker included in the motor circuits and operated by the control circuits, the blow-out coil of the circuit breaker being adapted to operate under an excess current to close the shunt circuit from the motor circuit to that portion of the control circuit operated to trip the circuit breaker.

The invention in its preferred details of construction will be described in the following specification, reference being had particularly to the accompanying drawings, in which:—

Figure 1 is a diagrammatic view illustrating the control system. Fig. 2 is a perspective view of the main controller, but one contactor being shown. Fig. 3 is an elevation of the reverser. Fig. 4 is a side elevation, partly in section, of the circuit breaker. Fig. 5 is a front view of the same. Fig. 6 is a side elevation, partly in section, of one of the contactors. Fig. 7 is a plan of the master controller. Fig. 8 is a side view of the cover for the motor controller showing the stop for the controller handle. Fig. 9 is a sectional view of the master controller showing details.

The present invention, which is directed to an automatic controller for motor-driven vehicles or the like, includes a number of distinct devices, as a master controller, a main controller, a reverser, a circuit breaker, and these parts, as also the various circuits, will be separately described in the following specification.

*Master controller.*—The master controller comprises an inclosed casing 1 designed to be secured in position convenient for the operator, the shell 2 of the casing being, if desired, mounted for sliding movement relative to the frame of the casing, to provide convenient access to the interior.

Within the casing is mounted for rotation a series of drums, three in number, and hereinafter referred to as the power drum 3, the trolley drum 4 and the reverse drum 5. These drums are mounted for operation in the manner usual to such structures, the power drum being controlled by a handle 6 removably connected to the end of the drum shaft projecting beyond the top of the casing, while the trolley and reverse drums are similarly operated by handles 7 and 8. Secured upon the power drum, in spaced parallel relation, are contact segments 9, 10, 11, 12 and 13. These segments are electrically connected one with another and are relatively disposed as follows: the first and second segments 9 and 10 are of equal lengths to include all of the indicated points of operation of the drum, being therefore duplicates; the next segments 11 and 12 are in horizontal alinement, arranged in spaced relation and of less length in the aggregate than either of the segments 9 and 10; the section 12 is in alinement with the forward or initial end of the segments 9 and 10, while the segment 11 is spaced from the segment 12 a distance corresponding to the distance between three indicated points on the master controller dial. The section 13, which is the lowermost section, has its forward or initial end in alinement with the similar end of section 11, while its rear end is in alinement with the rear ends of the sections 9 and 10.

The trolley drum, being adapted for reverse effective movements, is provided with two sets of segments, those on one side, including upper, lower and intermediate segments 14, 15 and 16, electrically connected, the first, 14, having a length corresponding to the aggregate length of the remaining segments, while the latter are each one-half the length of the first and relatively off-set from vertical alinement so that the intermediate section 15 alines with the forward or initial end of the first section, while the lower section 16 alines with the rear or final end of the first section. The opposing sections of the trolley drum are two in number 17 and 18, arranged in vertical alinement with the upper segments in horizontal alinement with the first opposing segment 14, while the lower segment 18 is arranged below the lowermost opposing segment 16.

The reverse drum, being also adapted for opposite effective movement, is provided with opposing sets of contact segments, those on one side including segments 19 and 20, electrically connected, and arranged in vertical alinement, while the opposing segment 21 is horizontally alined with the upper segment 19 and extends below the latter, terminating however above the upper end of the lower segment 21.

Adjacent the power drum, are arranged contact points 22, 23, 24 and 25 in position to be engaged by the respective segments of the power drum when the latter is operated, the segments 11 and 12 successively coöperating with the point 24. Contact points 26, 27, 28 and 29 are arranged in the master controller to be engaged by the trolley drum, the segments 14, 15 and 16 coöperating with the points 26, 27 and 28, while the segments 17 and 18 coöperate with the points 26 and 29. Adjacent the reverse drum are arranged contacts 30, 31 and 32, the segments 19 and 20, which are electrically connected, coöperating with the points 30 and 32, while the segment 21 coöperates with the points 30 and 31. Auxiliary contact points 33 and 34 are arranged in the casing to be engaged by the segments 9 and 10 of the master controller in the maximum movement of the power drum in one direction, as will presently appear.

The handle 6 of the power drum is provided with a catch 35, movably mounted on the under side of the handle and connected to a rod 37 projecting through the gripping member of the handle and carrying, at its upper end, a cap 38 designed to overlie the gripping member. A spring encircles the rod, being normally operative to hold the cap, and thereby the catch, in elevated position, the pressure of the hand of the operator upon the cap, however, serving to depress the catch to operative position. The surface of the casing of the master controller is provided with the usual dials 39, carrying points for indicating the position of the respective drum segments in the movement of the handle. The power drum handle coöperates with three stops 40, 41, and 42, the second of which is of such height that when the catch is elevated the handle will freely pass the stop, said stops 40 and 41 being the limits of handle in running operation of the master controller, while stop 42 positions the power drum to energize the brake setting mechanism, to be later described. The power drum, in running operation, is moved against the tension of a spring 43 which, upon the release of pull upon handle 6, tends to throw the drum in normal position. When hand of operator releases catch under handle spring 43 throws drum back to stop 42 thereby energizing brake setting mechanism.

*Main controller.*—The main controller comprises a casing including a suitable base board 44 on which, near one end, is mounted an operating shaft 45. Secured upon the base 44, adjacent the shaft 45, are a series of electro-magnets 46, 47, 48, the first of which will be hereinafter termed the operating magnet, the second, the checking magnet, and the third the release magnet. The core of the operating magnet is extended adjacent the shaft 45 in the form of a rack 49, arranged to engage a gear 50 fixed upon the shaft 45, so that during the energization of the operating magnet a constant operation of the shaft 45 is had, disregarding checking control. The core of the checking magnet is connected to one end of a lever 51, pivotally supported intermediate its ends by the projections in the magnet, and provided, at its free end, with a tooth to engage any one of a series of teeth in a wheel 53, secured upon the shaft 45. As the lever is fulcrumed intermediate its operative tooth and the core connected end, the energization of the magnet will depress the toothed end of the lever to engage the wheel, a spring 54 serving to draw the toothed end of the lever to inoperative position upon the deënergization of the magnet. The release magnet core is connected to a lever 55 intermediate its operative end and fulcrumed, the said lever being formed at its operative end to engage with a stop formed on a disk 56, secured upon the shaft 45. As the core of the release magnet is connected to the lever, intermediate its fulcrumed and operative end, the energization of the release magnet will withdraw the lever from the stop disk, the deënergization of the magnet permitting the lever to gravitate to stopping position. Secured upon the base, preferably between the operating and checking magnets, is a dash pot 57, the stem 58 of which is arranged in the form of a rack to engage the gear fixed on the shaft 45. The dash pot is preferably of the oil type and is utilized to keep a normal speed of operation in the controller, the checking bar of the dash pot being adjustable in any usual or preferred manner.

A second or contact shaft 59 is also mounted on the base of the main controller, being geared to the operating shaft 45 by gears 60. Fixed upon the contact shaft are a series of cam disks 61, each of which is designed to operate a contactor in the rotation of the contact shaft. It is to be understood, in this connection, that certain of the contactors lead the circuit through resistance grids, while others control the character of the coupling of the motors in the circuit. The cam disks 61 are supposed to successively operate the resistance contactors, while the motor coupling control contactors are operated under other than successive position of the shaft. Therefore, a detailed description of the function of the disks will appear in the operation of the device.

The contactors are arranged to be operated by the cam disks and are of simple switch type including a main contact arm 62, an auxiliary contact arm 63, pivotally supported in the crow lever 64, in turn fulcrumed upon a frame 65. The lever is connected to an operating lever 66 carrying a roller 67 at its lower end in the path of the operating cam disk. Springs 68 balance the movement of the auxiliary contact element, and connect the necessary yielding of said arm essential to a proper contact. A blow-out coil 69 is in circuit with the main contact arm 62, and the usual arc shields 70 are provided.

*Reverser.*—The reverser comprises a base 71 having end posts 72 and supporting reversely wound electro-magnets 73 and 74. A rectangular block of insulating material 75 is connected to the core 76, which core is of a length to serve for both magnets. The block is slidably mounted through the medium of projecting arms 77 guided in the end posts 72. The opposing side edges of the block 75 are provided with contact sections, those on one side including sections 78, 79, 80, 81, 82, 83 and 84, and those on the other side including sections 85, 86, 87, 88, 89, 90 and 91. The sections 78 and 80, 81, 83, on one side and 86, 88, and 89, 91 on the opposite side form electrically connected pairs. A series of contact fingers 92 are mounted on the base to engage the proper contact sections, said fingers forming the terminals of the circuit conductors in the usual manner. The sections 78, 79, 81, 82 and 84 on one side, 85, 86, 87, 89 and 90 on the opposite side are of a length to bridge two adjacent contact fingers, while the remaining sections are of a length to engage but one finger. The sections 84 and 85 on the respective sides are on the control circuit (later explained), and adjacent the fingers coöperating with these sections, in one position of the reverser, are fingers 93, 94 having ground connections. It will be obvious from the above construction that the block 75 may be moved in either direction upon the energization of the proper coil 73 or 74, and that upon such movement the sections will be moved to vary the connection between the fingers, as compared with the opposing position.

*Circuit breaker.*—The circuit breaker, which is particularly illustrated in Fig. 4, includes a main contact 95 and a movable contact 96 both arranged in the usual shield casing 97. The movable contact is pivotally supported at 98 on a lever 99, fulcrumed at 100 in a fixed part of the circuit breaker frame, the connection between the lever and the movable contact being yieldingly controlled by a spring 101. The opposing end of the lever 99, which lever is approximately of L-shape, is connected to the core 102 of an electromagnet 103 mounted in the circuit breaker frame. A latch 104 is pivotally mounted in the frame arm supporting the lever and connected, at the end remote from the lever, to a rod 105 forming the core of a second electromagnet 106. Upon the energization of the magnet 103, the movable contact is operated to engage the main contact, the forward end of the latch engaging in rear of the movable contact and holding the connection. Upon the energization of the electromagnet 106, the latch is operated to release the movable contact which breaks the connection. The main contact is in connection with a blow-out coil 107, and this coil is utilized to break the connection between the contacts in the event of an overload, while the circuit breaker is set. To accomplish this result, a bridge contact plate 108 is mounted on an armature 109 operated by the magnetism of the coil, and normally held open by a spring 110. Spaced points 111, 112 are arranged on the circuit breaker to be engaged by the plate 108 upon the energization of the blow-out coil, these points being arranged in an otherwise shunt circuit leading to the electromagnet 106, as will later appear. Therefore, in the event of an overload, the magnet 106 will be energized to release the connection between the contacts and the circuit breaker.

*Circuits.*—In describing the circuits, I will, for convenience, divide them into a control circuit and an operating circuit.

*Control circuit.*—An important result of the present invention is the arrangement of circuits so that the master controller of any one car can simultaneously govern and operate the main controllers of all coupled cars, and to accomplish this result each car, equipped with the present system, is provided with what I will hereinafter term six main conductors 113, 114, 115, 116, 117 and 118. The conductors are arranged lengthwise the car and are terminally formed for the usual plug and socket connection, so that the main conductors of any one car may be each electrically coupled to the similar conductors of the adjacent car, or cars. The service conductor 119, leading from the trolley or plow on the car, leads through the usual cut-out at 120, through a blow-out coil 121 and to the contact finger 26 of the trolley drum. The contact finger 27 is, by means of a conductor 122, in connection with the finger 22 of the power drum, while the finger 23, of the power drum, is by means of a conductor 123, in connection with the finger 30 of the reverse drum. The fingers 22 and 33, of the power drum, are connected by conductor 124, these connections constituting the sole connections between the contact fingers of the master controller, the remaining contact fingers being connected with the main conductors, previously noted. Fingers 24 and 25 of the power drum are, through conductors 125, 126, passing through the usual cut-outs, connected with the main conductors 115, 116 respectively; fingers 28 and 29 of the trolley drum are, through conductors 127, 128, connected with the main conductors 117, 118 respectively; fingers 31 and 32 of the reverse drum are connected, by conductors 129, 130, with the main conductors 113, 114, respectively; and finger 34 of the power drum is connected, through a conductor 131, with a coil 132 designed to operate a relief valve in brake controlling system 133.

The main conductors 113 and 114 are respectively connected, through conductors 134, 135, with the coils 74, 73 of the reverser, the remaining conductor of the coil 73 leading to a contact finger 136 of the reverser, the remaining conductor of the coil 74, as 137, leading to a finger 138 at the opposing end and on the opposite side of the reverser. On opposing sides of the finger 136 are arranged fingers 139, 140, the former, through a conductor 141, leading to the electromagnet 46 of the main controller, the finger 140 being grounded. On opposite sides of finger 138 are arranged fingers 142, 143, the former of which is connected to the conductor 141 while the latter is grounded.

The main conductor 115 is, through a conductor 144, connected to the electromagnet 47, while the main conductor 116 is, through a conductor 145, connected to the electromagnet 48. The electromagnets 46, 47 and 48 are to be grounded through a suitable resistance, as shown in Fig. 1. The conductor 145 leads through a manually controlled switch including one point 146 of a double throw, triple pole switch 147 and one point 148 of a double throw, two pole switch 149. The main conductors 117 and 118 are, by respective conductors 150, 151, led to the electromagnets 103 and 106 of the circuit breaker, said electromagnets being grounded through a suitable resistance. The service 119 in the car is connected with the main contact of the circuit breaker by a conductor 152 and led from the movable contact thereof through a conductor 153 with which the movable contacts of the respective resistance contactors, in the main controller, are connected in multiple, through conductors 154. The movable contacts of the respective resistance contactors, of the main controller, are connected by conductors 155 through suitable resistance 156, it being understood that each successive contactor directs the current through a decreasing amount of such resistance. From the fixed contact of the final resistance contactor, a conductor 157 leads to and through an overload relay 158 and from said relay by conductor 159 to and through a point 160 of the tripple pole switch (when the latter is set), from said point by conductor 161 to a finger 162 of the reverser. An adjacent finger 163 is connected by conductor 164 to and through the armature 165 of a driving motor, from said armature by conductor 166 to a finger 167 of the reverser, from a second finger 168 of the reverser, by a conductor 169, to and through the field 170 of the same motor and from the field by conductor 171 to a second point 172 of the tripple pole switch. From the connect point of said switch, a conductor 173 leads to the movable contact of the first contactor following resistance contactors, as 174, which contactor will be hereinafter termed the series contactor. The fixed contact of the series contactors is connected by contactor 175 through one blade of the double pole switch, to a point 176 of said switch, and from said point by conductor 177 to a finger 178 of the reverser, and from an adjacent finger 179, by a conductor 180 to and through an armature 181 of a second motor, from said armature by a conductor 182 to a finger 183 of the reverser, from a connected finger 184 to a conductor 185 to and through the field 186 of the second motor and to ground.

The next contactor of the main controller, as at 187, will be termed parallel contactor, its movable contact arm being connected by conductor 188 to the conductor 157 previously described, while its fixed contact arm is connected by a conductor 189 to the conductor 175 previously described. The final contactor 190 of the main controller will be termed a ground contactor, its movable contact being connected by a conductor 191 to the conductor, from the movable contact of the series contactor, the fixed contact of the ground contactor being grounded at 192.

The remaining points 193, 194 of the triple pole and double pole switches are connected by conductor 195, and the opposing points of said switches are so arranged that, in the opposite position from that shown, the conductors 159 and 173 are connected through the triple pole switch, while the conductor 175 is grounded through the double pole switch.

A second set of two motors is used, the field 196 of one of said motors being connected to a finger 197 of the reverser, an adjacent finger 198 being connected by conductor 199 to the armature 100 of said motor and from said armature by a conductor 200 to a finger 201 of the reverser. An adjacent finger 202 is connected by conductor 203 to the conductor 161, previously described. The field 204 of the second motor, grounded on one side, is connected at the opposite side to a conductor 205 through a finger 206 of the reverser, a second finger 207 being connected by a conductor 208 to the armature 209 of the second motor from the armature by conductor 210 to a finger 211 of the reverser, an adjacent finger 212 being connected by conductor 213 to the conductor 177, previously described.

As will be plain from Fig. 1 of the drawings, the reverser, in one position, as for example in the position occupied upon the energization of the coil 73, will so arrange the contact strips thereof as to electrically connect, on one side of the reverser, the fingers 183 and 184; 178 and 179; 167, 168; 162 and 163; 138 and 143; and, on the opposite side, fingers 136 and 139; 206 and 207; 211 and 212; 197 and 198; and 201 and 202. In the reverse position, contact strips are shifted longitudinally, so that the strip 85 bridges the finger 136 and 140 grounding the conductor from the coil 73, while the strip 84 will connect the finger 138 and 142 connecting the coil 74 with the conductor 141 leading to the operating electromagnet 46 of the main controller. Therefore, in either position of the reverser, the operating magnet 46 will be energized. The electrical juncture of the fingers incident to the second or reverse position of the block 75 of the reverser will be obvious from Fig. 1 and needs no specific description herein.

The overload relay 158 carries a connector strip 214, designed, in the event of an excess current, to engage and bridge spaced points 215, 216 which are respectively connected to conductors 217, 218 with the conductor 153, leading to the resistance contactors and with the conductor 144 leading to the checking electromagnet 47, shunting the current around the contactors to such checking magnet, with the effect hereinafter noted.

I will now describe the operation of the improved controlling mechanism.

The current is directed from the trolley through the service conductor 119 and to the finger 26 of the trolley drum. With the drum set in the advanced position, the current is led from the finger 26 through the segments 14 and 15 to the finger 27, thence to finger 22 of the power drum, and when said drum is set in initial position, through the segments 9 and 10, to the finger 23, and thence by conductor 123 to the finger 30 of the reverse drum. With the reverse drum in the forward position, the segments 19 and 20 connect the fingers 30 and 32, thereby directing the current over the conductor 130, to the main conductor 114, thence to the coil 73 of the reverser, holding said reverser in the position indicated in Fig. 1, and from said coil through conductor 141 to the operating magnet 46 of the main controller, and from said magnet to ground. This energizes the operating magnet 46, drawing upon the rack 49 and revolving the contact shaft 59. At the same time, the current is, by means of the segments 9 and 10 of the power drum, directed through finger 24, engaged by segment 12, through conductor 125 to the main conductor 115, and from said main conductor to the checking magnet 47 of the main controller. The checking magnet is thus operated simultaneously with the operating magnet, so that the contactor shaft is revolved far enough to make first point of resistance. In the second position of the power drum the checking magnet is cut out, so that the operating magnet continues gradually cutting out resistance until the motors are in full series operation with all resistance cut out. In this connection, it is to be understood that as long as the resistance contactors are being operated in the initial control, through the master controller, the disk controlling the series contactor 174 is maintaining said contactor closed, so that the motors are in series through the following circuit; conductor 152, circuit breaker, conductor 153, conductor 154, conductor 157, overload magnet 158, conductor 159, triple pole switch, point 160, conductor 161, fingers 162, 163 of the reverser conductor 164, armature 165, conductor 166, finger 167, finger 168, conductor 169, field 170, conductor 171, triple pole switch, conductor 173, series contactor 174, conductor 175, double pole switch, conductor 177, fingers 178, 179 of the reverser, conductor 180, armature 181 of the motor, conductor 182, reverser fingers 183 and 184, conductor 185, motor field 186 and ground.

When the operating magnet 46 has operated the contactor shaft 59, so that the motors are in full series with all resistance cut out, the operating shaft 45 will have reached such a position that the operative end of the lever 55 will engage one of the diametrically opposed stops on the disk 56 and limit further movement of the parts, thus maintaining the motors in full series. If it is now desired to couple the motors in parallel, the hand of the master controller is moved to the third position, turning the power drum so that the current is, through the segment 13, directed through the finger 25, conductor 126, main conductor 116, conductor 145, to the release magnet, energizing said magnet and releasing the disk 56 and permitting further operation of the contactor. With the parts in this position it will be noted that the motors are in full parallel with second point of resistance. In changing from series to parallel the first motors are grounded by contactor at 190; series contactor 174 is released; this throws first motors in parallel with second point of resistance second motors cut out; then the parallel contactor 187 is thrown in placing second motors in parallel; this position makes all motors in parallel on second point of resistance that is with the second resistance contactor closed. This is a particularly important part of the present invention as thereby I gain a steady pull of the motors in changing from series to parallel and obviate all disadvantages incident to a full cutting out of the motors as is done under the usual conditions of other devices in making such a change. In the third position of the power drum, as just described, it will be noted that the segment 11 engages the finger 24. This directs the current through the conductor 125, main conductor 115 conductor 144, and check magnet 47 of the main controller, checking the further operation of the contactor shaft, and holding it set on second resistance, that is second resistance contactor closed, it being understood that the cam projections on the contactor operating disks are arranged for such result. The power drum is moved to the fourth point or position cutting out the checking magnet 47 and permitting the contactor shaft to be revolved, the continued revolution of said shaft gradually cutting out resistance. The circuits incident to the change from series to full parallel will be obvious from Fig. 1 of the drawings.

The circuit breaker is set by operating the trolley drum to cause the segments 17 and 18 to engage the fingers 26 and 29, directing the current over conductor 128 to the main conductor 118 through the electromagnet 103 of the circuit breaker to ground, this, as previously described, closing said circuit breaker contacts. In the event of an overload, the magnetism in the blow-out coil attracts the armature 109 bridging the points 111 and 112 and shunting the current from the conductor 153 to the electromagnet 106, through a conductor 219. This releases the catch and opens the circuit breaker.

In the event of an increase of current, the cut-out 158 will be operated to connect the points 215 and 216 and shunt the current from the conductor 153 to the checking magnet and thereby check the operation of the main controller, and when the current reduces the spring breaks the shunt contact and permits further and continued operation of the main controller. Main controller is thrown off by strong coil spring at end of shaft 45.

It will be noted that at the cut-out switches 147 and 149, the position shown in Fig. 1 controls the current to both sets of motors, thereby permitting the series coupling described. When, however, the switch is reversed, it will be obvious that one set of the motors is cut out, and that in this second position of the switch the conductor 145, leading from the main conductor 116 to the release magnet 48, is broken, hence it is impossible for the main controller to move to the parallel position.

As previously described, the spring 43 tends to throw the power drum, when the handle thereof is released, against the stop 42, in which position of the drum the segments 9 and 10 thereof engage the fingers 33 and 34. The current is then directed over the conductor 131 to the electromagnet 132, bleeding the train pipe by the operation of a suitable valve, and applying the brakes. Therefore, upon the release of the power drum handle, the brakes are automatically applied. If coasting position is desired, the motorman's hand is held on the top of the handle to depress the catch 35, and the handle moved back to a coasting notch, thereby preventing the brake actuating contact and permitting the car to travel under its own momentum. As long as the operator's hand is maintaining the catch 35 depressed, the handle may play freely between the stops 40 and 41, which is the full control movement of the handle, and the braking position cannot be secured until the pressure on the catch is released. In the event it is desired to hold the motors in parallel on a certain resistance point, the handle of the power drum of the master controller is moved from the second point, at which the main controller is free for continuous movement, back to the first point, checking the further operation of the main controller, and holding the motors operating on the desired point of resistance.

When reverse is desired, the reverse drum handle is moved to a position to cause the segment 21 to engage the fingers 30 and 31, directing the current over conductor 129 to the main conductor 113 and to the electromagnet 74 of the reverser, thereby operating the block 75 in a forceful and energetic manner to reverse to the position of the contact strips of the said block and thereby so direct the current through the respective fingers as to reverse the operation of the motors, as will be clear from Fig. 1 of the drawings.

As previously stated, the main conductors extend lengthwise of the car and are provided at their respective ends for plug and socket or other connections with the similar conductors of couple car. As the circuits on each car are, of course, identical, it is obvious that from such connection of the main conductors the master controller of any one car of a series of couple cars can control and operate the main controllers and connected parts of all cars.

It will be obvious from the above description, that the improved controlling system is simple and provides the maximum control and efficiency in use, employing few magnets and having a wide range of adjustment on different load conditions. The simplicity of the structure insures a low installation and maintenance cost, while the arrangement of the movable parts, where electrically operated, is such as to insure quick and positive action and thereby rendering the control more certain and effective in cases of emergency.

Claims:

1. A control system including a master controller, a main controller, means for operating the main controller, means governed by the master controller for actuating said operating means, and main controller checking means actuated in the first position of the master controller beyond the normal.

2. In a control system, a master controller, a main controller, operating means for the main controller, means governed uninterruptedly in all on positions of the master controller to continually actuate the operating means of the main controller, and means governed by the master controller in certain positions thereof for checking the actuation of the main controller.

3. In a control system, a master controller, a main controller, operating means for the main controller, means operative uninterruptedly in all on positions of the master controller to continually actuate the operating means of the main controller, and means operated in the first and third positions of the master controller to check the operation of the main controller.

4. In a control system, a master controller, a main controller, a plurality of resistance contactors carried by the main controller, means for operating the main controller to successively close said contactors, means operative in all on positions of the master controller for actuating the operating means of the main controller, and means operable in the first and third running positions of the master controller for checking the operation of the main controller.

5. In a control system, a plurality of motors and circuits therefor, a master controller, a main controller, a plurality of resistance contactors carried by the main controller, a series contactor carried by the main controller for holding the motor circuits in series, means for operating the main controller to close the series contactor and successively close the resistance contactors, means governed uninterruptedly in all on positions of the master controller for actuating the operating means of the main controller, and means operative in certain positions of the master controller for checking the operation of the main controller to automatically stop said main controller upon the cutting in of the series contactor and the first resistance contactor.

6. In a control system, a master controller, a main controller, a plurality of resistance contactors carried by the main controller, a motor circuit including said resistance contactors, means for operating the main controller to successively close said contactors, a control circuit including the last-named means, means operated by the master controller for uninterruptedly energizing the control circuit in all on positions of the master controller, and means operative in the first and third on positions of the master controller to check the main controller succeeding the cutting in of the first resistance contactor.

7. In a control system for a plurality of motors, a master controller, a main controller, a series of resistance contactors, an actuating means for the main controller energized continually from the first resistance point with the motors in series until the resistances are cut out with the motors in parallel.

8. In a control system for motor propelled vehicles, a master controller having a plurality of on positions, a brake mechanism energized in the off position of the master controller, the second position of said controller being the coasting position of the vehicle, and a main controller controlled uninterruptedly in all on positions of the master controller.

9. In a control system for motor propelled vehicles, a master controller having a plurality of running positions, brake mechanism for the vehicle energized in the off position of the master controller, a main controller, and an operating means for the main controller energized in all operative positions of the master controller.

10. In a control system, a master controller, a main controller, means energized uninterruptedly in all on positions of the master controller to continuously energize said operating means, and means for checking said operating means in certain on positions of the master controller.

11. In a control system, a master controller, a main controller, means energized in all operative positions of the master controller and tending to continually actuate said operating means, means for checking the last-mentioned means in certain operative positions of the master controller, a plurality of motors, circuits for the motors and including said main controller, and means operable from the main controller in certain operative positions of the master controller to connect the motors in series and parallel without deënergizing the circuits.

12. A control system for a series of motors including a master controller, a main controller, a ground motor circuit contactor carried by the main controller, a parallel motor circuit contactor carried by the main controller, operating means governed by the master controller for successively closing the ground and parallel contactors, an automatic stop carried by the main controller for checking the operating means prior to closing the ground and parallel contactors, and means controlled by the master controller in one position for releasing said stop.

13. A control system including a reverser comprising a base, contact fingers carried thereby, oppositely acting coils mounted on the base, a core for both coils, a slide bar connected to the core, finger engaging contact segments carried by the bar, a master controller, independent circuits leading from the master controller to the respective coils of the reverse, means carried by the master controller for energizing either circuit, a main controller, operating means therefor, the control circuits from both coils leading to and governing the operating means.

14. A control system including a control circuit, a motor circuit, a circuit breaker including contacts connected in the motor circuit, means operated by the control circuit for actuating the contacts, and means operated by an excess current through the breaker to shunt the motor circuit to the control circuit.

15. A control system including a control circuit, a motor circuit, a circuit breaker including a main contact and a movable contact, said contacts being arranged in the motor circuit, a setting coil arranged to operate the movable contact in one direction, a catch for locking the contact in the position assumed under the influence of the coil, a trip coil for releasing the catch, said coil being arranged in the control circuit, and means operated by an excess current in the motor circuit to shunt such circuit to the control circuit for the energization of the trip coil.

16. A control system including a control circuit, a motor circuit, a circuit breaker including a main contact and a movable contact, said contacts being arranged in the motor circuit, a setting coil arranged to operate the movable contact in one direction, a catch for locking the contact in the position assumed under the influence of the coil, a trip coil for releasing the catch, said coil being arranged in the control circuit, a blow-out coil arranged in the motor circuit, a shunt circuit from the motor circuit to the trip coil and broken adjacent the blow-out coil, and means operated by the magnetism of the blow-out coil to close the break in the shunt circuit.

17. A control system including a master controller, a main controller, a contactor shaft mounted in the main controller, a series of contactors carried by the main controller, means carried by the shaft to successively operate said contactors, an electromagnet for continuously operating the shaft in one direction, a checking magnet for checking the movement of the shaft, and independent circuits controlled by the master controller for operating the electromagnet and checking magnet.

18. A control system including a master controller, a main controller, a contactor shaft mounted in the main controller, a series of contactors carried by the main controller, means carried by the shaft to successively operate said contactors, an operating magnet for actuating the shaft, a checking magnet for limiting the movement of the shaft, a control circuit for the operating magnet energized in all running positions of the master controller, and a control circuit for the checking magnet energized in one position of the master controller.

19. A control system including a main controller, a series contactor carried thereby, a parallel contactor carried thereby, means normally preventing movement of the main controller to close the parallel contactor, a motor circuit, and cut-out switches adapted in one position to permit energization of a specified number of motors only less than the whole, said switches in the latter position precluding possible operation of said preventing means, whereby, when the switches are in position to permit energization of a portion only of the motors, the main controller cannot be operated to close the parallel contactor.

20. A control system including a plurality of motors, energizing circuits, a series contactor for arranging all of said motors in series, a parallel contactor for arranging said motors in parallel, and manually operable means whereby the motor circuit may be arranged for the energization of all the motors or for the energization of a portion only thereof, said manually operable means in the latter position locking the parallel contactor against operation.

21. In a control system, a master controller, a main controller, means for operating the main controller from the master controller, means for checking the operation of the main controller, and a current relay operable under excess current conditions to bring about the energization of the checking means whereby the operation of the main controller will be checked.

22. In a control system, a plurality of motors, a circuit for energizing said motors, means for controlling the flow of current to said circuit to energize the motors, means for checking the operation of the first-named means, and means operable under excess current conditions to shunt the current from said energizing circuit through said checking means whereby the operation of the said controlling means is stopped.

23. In a control system, a plurality of motors, a circuit for energizing the motors, a main controller for controlling the flow of current from said circuit to the motors, a master controller for controlling said main controller, checking means operable from said master controller for checking the operation of said main controller; and means operable automatically under excess current conditions to shunt the current from said energizing circuit through said checking means whereby the operation of the main controller will be stopped.

In testimony whereof I affix my signature in presence of two witnesses.

SAMUEL P. ARMSTRONG.

Witnesses:
KATIE HUNKER,
HATTIE VAUGHAN.

---

Copies of this patent may be obtained for five cents each, by addressing the "Commissioner of Patents, Washington, D. C."